(12) United States Patent         (10) Patent No.:     US 9,191,434 B2
Robert et al.                             (45) Date of Patent:    \*Nov. 17, 2015

(54) SYSTEM AND METHOD FOR MANAGING DIGITAL MEDIA CONTENT

(71) Applicant: Disney Enterprises, Inc., Burbank, CA (US)

(72) Inventors: Arnaud Robert, Simi Valley, CA (US); Edward C. Drake, Stevenson Ranch, CA (US)

(73) Assignee: Disney Enterprises, Inc., Burbank, CA (US)

( \* ) Notice: Subject to any disclaimer, the term of this patent is extended or adjusted under 35 U.S.C. 154(b) by 0 days.

This patent is subject to a terminal disclaimer.

(21) Appl. No.: 13/732,132

(22) Filed: Dec. 31, 2012

(65) Prior Publication Data

US 2013/0132516 A1     May 23, 2013

Related U.S. Application Data

(63) Continuation of application No. 12/383,723, filed on Mar. 26, 2009, now Pat. No. 8,359,370.

(60) Provisional application No. 61/110,488, filed on Oct. 31, 2008, provisional application No. 61/110,484, filed on Oct. 31, 2008, provisional application No. 61/110,485, filed on Oct. 31, 2008.

(51) Int. Cl.

| | |
|---|---|
| *G06F 15/16* | (2006.01) |
| *H04L 29/08* | (2006.01) |
| *G06F 17/30* | (2006.01) |
| *G11B 27/034* | (2006.01) |
| *H04N 9/87* | (2006.01) |

(52) U.S. Cl.
CPC .......... *H04L 67/10* (2013.01); *G06F 17/30979* (2013.01); *G11B 27/034* (2013.01); *H04N 9/87* (2013.01)

(58) Field of Classification Search
CPC ..... H04L 65/60; H04L 65/601; H04L 65/602; H04L 65/605; H04L 67/30
USPC .................................................. 709/217–219
See application file for complete search history.

(56) References Cited

U.S. PATENT DOCUMENTS

| | | |
|---|---|---|
| 7,962,933 B2 | 6/2011 | Huang |
| 2002/0107973 A1 | 8/2002 | Lennon |
| 2004/0024720 A1 | 2/2004 | Fairweather |
| 2004/0078484 A1 | 4/2004 | Parry |
| 2005/0276570 A1 | 12/2005 | Reed |
| 2005/0289277 A1 | 12/2005 | Jackson |
| 2006/0265427 A1 | 11/2006 | Cohen |
| 2007/0067427 A1 | 3/2007 | Bugir |

(Continued)

*Primary Examiner* — Jason Recek
(74) *Attorney, Agent, or Firm* — Farjami & Farjami LLP (57) ABSTRACT

There is presented a system for managing digital media content, the system comprising a media server accessible over a communications network, the media server including a server processor. The server processor is configured to identify a first container data structure, the first container data structure including the digital media content encoded in a first encoding format. The server processor is also configured to use a digital media profile, and to extract a media file including the digital media content encoded in the first encoding format, from the first container data structure, according to the digital media profile. The server processor is further configured to assemble the media file in a second container data structure.

20 Claims, 4 Drawing Sheets

(56) References Cited

U.S. PATENT DOCUMENTS

| | | |
|---|---|---|
| 2007/0078898 A1 | 4/2007 | Hayashi et al. |
| 2007/0083380 A1 | 4/2007 | Martinez |
| 2007/0083558 A1 | 4/2007 | Martinez |
| 2007/0083762 A1 | 4/2007 | Martinez |
| 2007/0100834 A1 | 5/2007 | Landry |
| 2007/0130127 A1 | 6/2007 | Passmore |
| 2007/0157242 A1* | 7/2007 | Cordray et al. ............ 725/46 |
| 2007/0180133 A1 | 8/2007 | Vedantham |
| 2007/0185815 A1 | 8/2007 | Boccon-Gibod |
| 2007/0219937 A1 | 9/2007 | Lee |
| 2007/0233740 A1 | 10/2007 | Nichols |
| 2007/0250781 A1 | 10/2007 | Dolph |
| 2008/0021926 A1 | 1/2008 | Brock |
| 2008/0025707 A1 | 1/2008 | Sawada |
| 2008/0091606 A1 | 4/2008 | Grecia |
| 2008/0098004 A1 | 4/2008 | Matsuoka |
| 2008/0126543 A1 | 5/2008 | Hamada |
| 2008/0162498 A1 | 7/2008 | Omoigui |
| 2008/0168523 A1 | 7/2008 | Ansari |
| 2008/0201225 A1* | 8/2008 | Maharajh et al. ............ 705/14 |
| 2008/0215979 A1 | 9/2008 | Clifton |
| 2008/0269931 A1 | 10/2008 | Martinez |
| 2009/0106279 A1* | 4/2009 | Bae ............ 707/100 |
| 2009/0204475 A1 | 8/2009 | Cohen |
| 2010/0235428 A1 | 9/2010 | Kikkawa |

* cited by examiner

SYSTEM AND METHOD FOR MANAGING DIGITAL MEDIA CONTENT

RELATED APPLICATIONS

This application is a continuation of U.S. application Ser. No. 12/383,723, filed Mar. 26, 2009, which claims priority to U.S. Provisional Application No. 61/110,488 filed on Oct. 31, 2008, U.S. Provisional Application No. 61/110,484 filed Oct. 31, 2008, and U.S. Provisional Application No. 61/110,485 filed on Oct. 31, 2008, which are hereby incorporated by reference in their entirety.

BACKGROUND OF THE INVENTION

1. Field of the Invention

The present invention relates generally to the management of digital media content. More particularly, the present invention relates to systems and methods for containing and distributing digital media content.

2. Background Art

Films, television programming, entertainment trailers, and the like, are examples of content that lends itself to distribution in the form of digital media files. Typically, such media content is prepared for distribution in three general steps. First, the content may be encoded in any of a number of available encoding formats to address the diversity of distribution platforms and the devices on which the media are to be played back. For example, media content may be encoded in conformity with Windows Media Video (WMV), Moving Picture Experts Group compression standards such as MPEG-2 and MPEG-4, On2 VP6, and other formats supported by consumer playback devices including cable and satellite set-top boxes, online video via the Internet, and portable playback devices such as mobile handsets and mobile video players. Second, the encoded media may be inserted into, i.e., "wrapped in", one of many different container formats, for example, QuickTime, Advanced Systems Format (ASF), or MP4. Third, metadata associated with the media typically is produced separately, and is commonly replicated many times over for each distribution platform. In addition, in some cases, other content or applications such as interactive menus, games, and other programs associated with the core media content may be produced by another set of third party contributors.

Because the described packaging process utilizes data and protocols created by independent parties, there may be little or no compatibility between the different elements within a media package. As a result, the wrapping is often a complex and costly process. Producers and distributors of the core media content being distributed in this manner usually must carry a multitude of instantiations of the same core media content to service the myriad device environments in use. For example, in the mobile space alone there are many dozens of instantiations that need to be created simply to address the majority of the mobile telephones in use. Moreover, there are a multitude of different combinations of encoding format/metadata scheme/container format, and in most cases a single such combination targets a single device or a limited subset of devices, thus hindering media interoperability across multiple devices.

As a result, a consumer may be limited in their ability to experience the entire aesthetic impact of the media content, as conceived by its producers, due to constraints on the combination of encoding format, metadata scheme, and container format targeted to their particular playback device. For example, a number of the presently available container formats address specific platform requirements, e.g., QuickTime, MP4, and ASF, but these container formats may lack the flexibility to do complete justice to the richness and diversity of elements that may be relevant to the core media content. In addition, existing container formats are typically unsuitable environments for storage or assembly of more than one version of an item of core media content, such as multiple versions of the same core media content in different encoding formats.

Accordingly, there is a need to overcome the drawbacks and deficiencies in the art by providing a solution for managing digital media content that provides an integrated and substantially comprehensive storage of the many different content elements relevant to, or associated with a core media content.

SUMMARY OF THE INVENTION

There are provided systems and methods for managing digital media content, substantially as shown in and/or described in connection with at least one of the figures, as set forth more completely in the claims.

BRIEF DESCRIPTION OF THE DRAWINGS

The features and advantages of the present invention will become more readily apparent to those ordinarily skilled in the art after reviewing the following detailed description and accompanying drawings, wherein.

DETAILED DESCRIPTION OF THE INVENTION

The present application is directed to a system and method for managing digital media content. The following description contains specific information pertaining to the implementation of the present invention. One skilled in the art will recognize that the present invention may be implemented in a manner different from that specifically discussed in the present application. Moreover, some of the specific details of the invention are not discussed in order not to obscure the invention. The specific details not described in the present application are within the knowledge of a person of ordinary skill in the art. The drawings in the present application and their accompanying detailed description are directed to merely exemplary embodiments of the invention. To maintain brevity, other embodiments of the invention, which use the principles of the present invention, are not specifically described in the present application and are not specifically illustrated by the present drawings. It should be borne in mind that, unless noted otherwise, like or corresponding elements among the figures may be indicated by like or corresponding reference numerals.

The present inventors recognize the drawbacks and deficiencies of conventional solutions for managing and distributing digital media content, and have succeeded in overcoming those disadvantages by providing a container data structure, as well as systems and methods utilizing such a structure to manage digital media content. The present application describes various embodiments of a novel container data structure concept, for use in managing digital media content. Those embodiments include a master container data structure embodiment and a singlet container data structure embodiment, for example. In some embodiments, a singlet container data structure may be produced from a master container data structure. It is noted that for the purposes of the present application, the expression "container data structure" may apply to either or both a master container data structure and a singlet container data structure.

Figure 1:
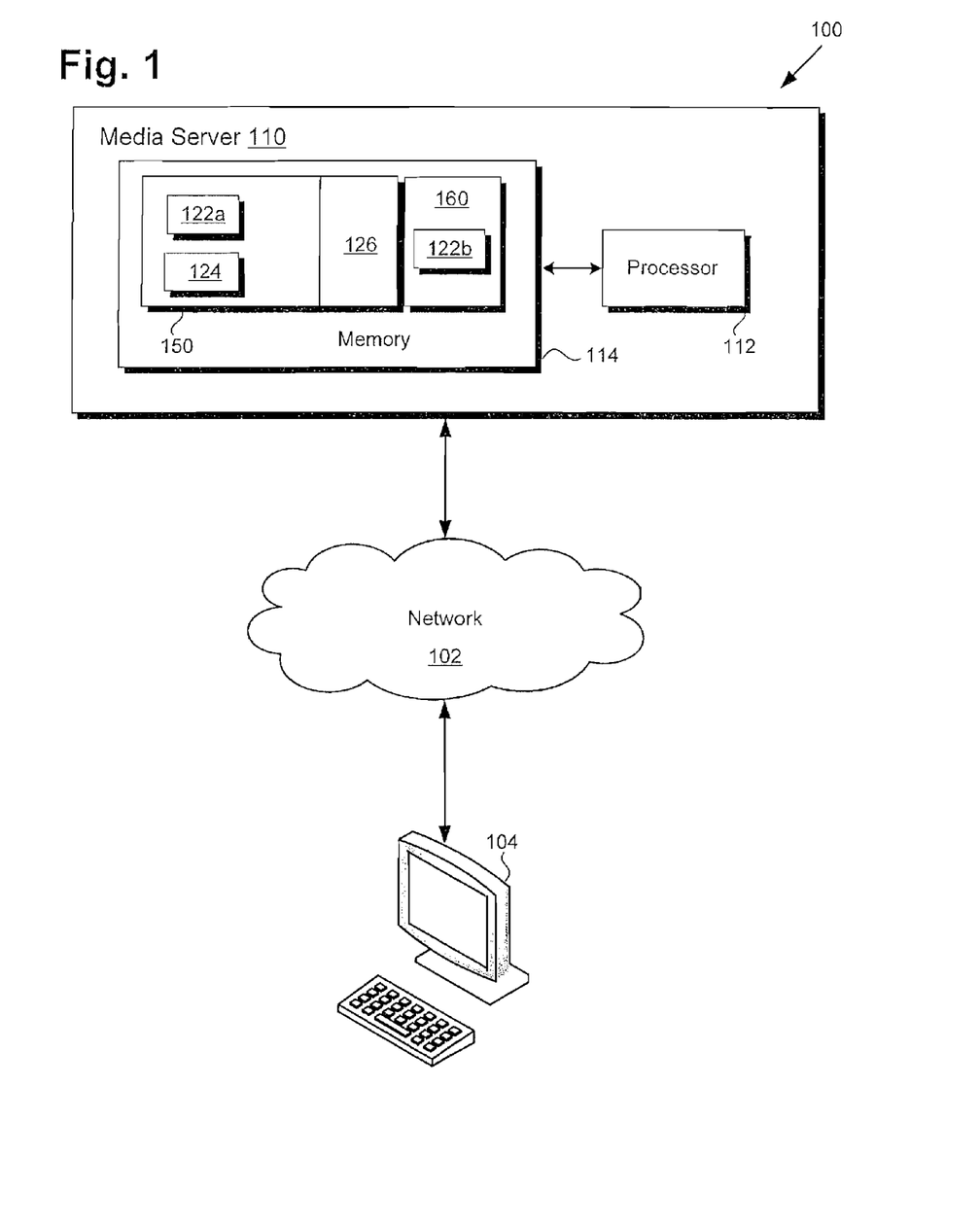
FIG. 1 shows a block diagram of a system for managing digital media content, according to one embodiment of the present invention.

FIG. 1 shows a block diagram of system 100 for managing digital media content, according to one embodiment of the present invention. In the embodiment of FIG. 1, system 100 comprises media server 110 including server processor 112 and server memory 114. As shown in FIG. 1, media server 110 is accessible over network 102, which may be any suitable communications network. System 100 also comprises master container data structure 150 including media files 122a and 124, as well as application interface 126, stored in server memory 114. Also stored in server memory 114, is singlet container data structure 160 including media file 122b. FIG. 1 further shows client system 104, represented as a personal computer (PC), in communication with media server 110 through network 102. It is noted that although in the embodiment of FIG. 1, client system 104 is represented as a PC, in another embodiment, client system 104 may comprise a home entertainment media player, such as a standard definition (SD) digital video disc (DVD) player or high-definition (HD) Blu-ray disc player, for example. In still other embodiments, client system 104 may comprise any of a variety of portable communication devices such as a tablet computer, mobile telephone, personal digital assistant (PDA), digital media player, or wireless gaining console, for example.

According to the embodiment of FIG. 1, server processor 112 may be configured to utilize master container data structure 150 to manage digital media content, represented in FIG. 1 by media files 122a and 124, which may be distinct instantiations of digital media content having different encoding formats, for example. System 100 provides a mechanism for the owner of the digital media content, such as the content corresponding to media files 122a and 124, to include a variety of different media elements that are relevant to or otherwise logically associated with the digital media content. The present system enables use of a container data structure, such as master container data structure 150, as an archive for substantially all of the elements associated with the digital media content, in a single integrated file format. In addition, the present system enables use of a container data structure, such as singlet container data structure 160, to collectively store media elements relevant to, or associated with, a particular instantiation of the digital media content.

Although in the embodiment of system 100, server processor 112 is shown to manage the digital media content corresponding to digital media files 122a and 124, that need not be true in all embodiments. For example, in one embodiment, a processor local to client system 104 could perform the management operations presently associated with server processor 112. In addition, in one embodiment, client system 104 may be in direct communication with media server 110 without the intercession of network 102. As a specific example of the latter embodiment, a user of a portable device such as an iPod or other digital media player could connect that device to a terminal provided in a media distribution kiosk, to perform the digital media management operations presently disclosed.

In the embodiment shown by system 100, master container data structure 150 may function as an intermediate format for digital media content owners as well as third party content producers to collect media elements relevant to, or associated with, the digital media content represented by media files 122a and 124. Those elements may include, for example, global descriptive metadata directed to intrinsic features of the core digital media content and independent of any specific encoding format or presentation profile associated with a particular media file, e.g., metadata applicable to both media files 122a and 124. Such elements may also include one or more digital media profiles targeted to particular instantiations of the digital media content, e.g., a digital media profile descriptive of one, but not both, of media files 122a or 124. In addition the media elements may include interactive content attributes such as menuing content, movie or television trailers, games associated with the core media content, and advertising content, for example. In some embodiments, master container data structure 150, and/or singlet container data structure 160 can be left "open" so that multiple parties can contribute media elements, and then be "closed" once all the desired elements are incorporated into the respective container data structures.

Server processor 112 may also be configured to utilize application interface 126 of master container data structure 150 to assemble singlet container data structure 160 from the contents of master container data structure 150. For example, in the embodiment of FIG. 1, singlet container data structure 160 is shown to include media file 122b, which may be seen to correspond to the version of digital media content stored in master container data structure 150 as media file 122a. Singlet container data structure 160 may then be utilized by media server 110 to further provide the core digital media content corresponding to media file 122a or 122b to client system 104, over network 102.

Figure 2A:
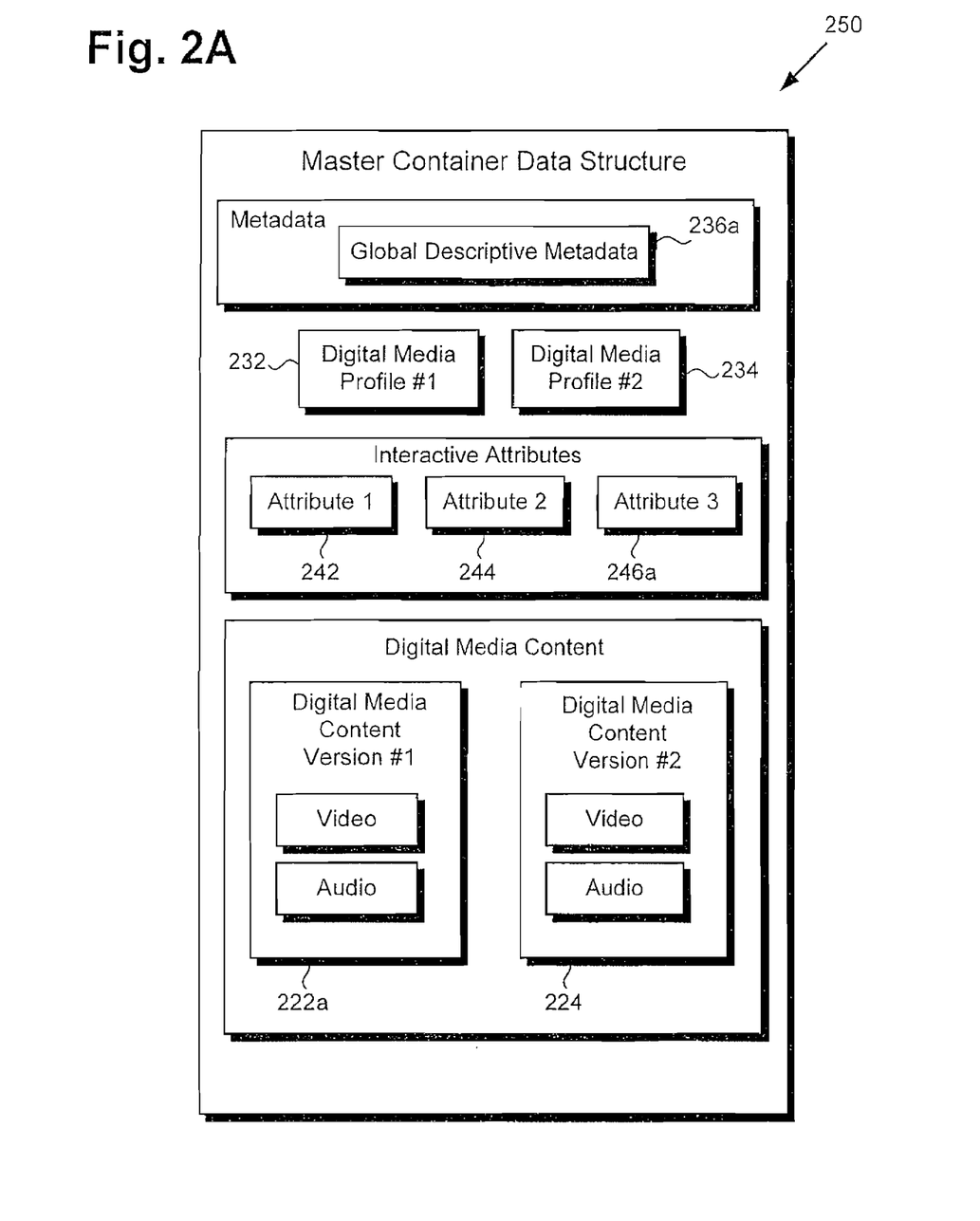
FIG. 2A shows a block diagram of a master container data structure for use in a system for managing digital media content, according to one embodiment of the present invention.

Singlet container data structure 160 may be assembled according to one or more specifications provided by a digital media profile (shown in FIG. 2A and described in greater detail in relation to that figure). For example, processor 112 may utilize such a digital media profile to select individual media elements—e.g., particular versions of the digital media content, global descriptive metadata, security protocols, and interactive media attributes—for inclusion in singlet container data structure 160. Those media elements may be tagged to correspond to the encoding format of media file 122a, and be identified and selected for inclusion in singlet container data structure 160 according to metadata included in the corresponding digital media profile. In this manner, system 100 can ensure that the media elements included in singlet container data structure 160 for distribution with media file 122b are compatible with the resolution of media file 122b, a particular distribution channel selected for distribution of singlet container data structure 160, or the known playback resources available to client system 104, for example. It is noted that although the present discussion centers on formation of singlet container data structure 160 from contents selected out of master container data structure 150, the process may also work in reverse. That is to say, in some embodiments, the contents of one or more representation of singlet container data structure 160 may be harvested and collected into master container data structure 150.

As shown in FIG. 1, the digital media content represented by media files 122a and 124, stored in master container data structure 150, may be accessed through network 102. In one such embodiment, media server 110 may comprise a web server, accessible over a packet network such as the Internet, for example. Alternatively, master container data structure 150 and/or singlet container data structure 160 may reside on a media server supporting a local area network (LAN), or included in another type of limited distribution network.

Figure 2B:
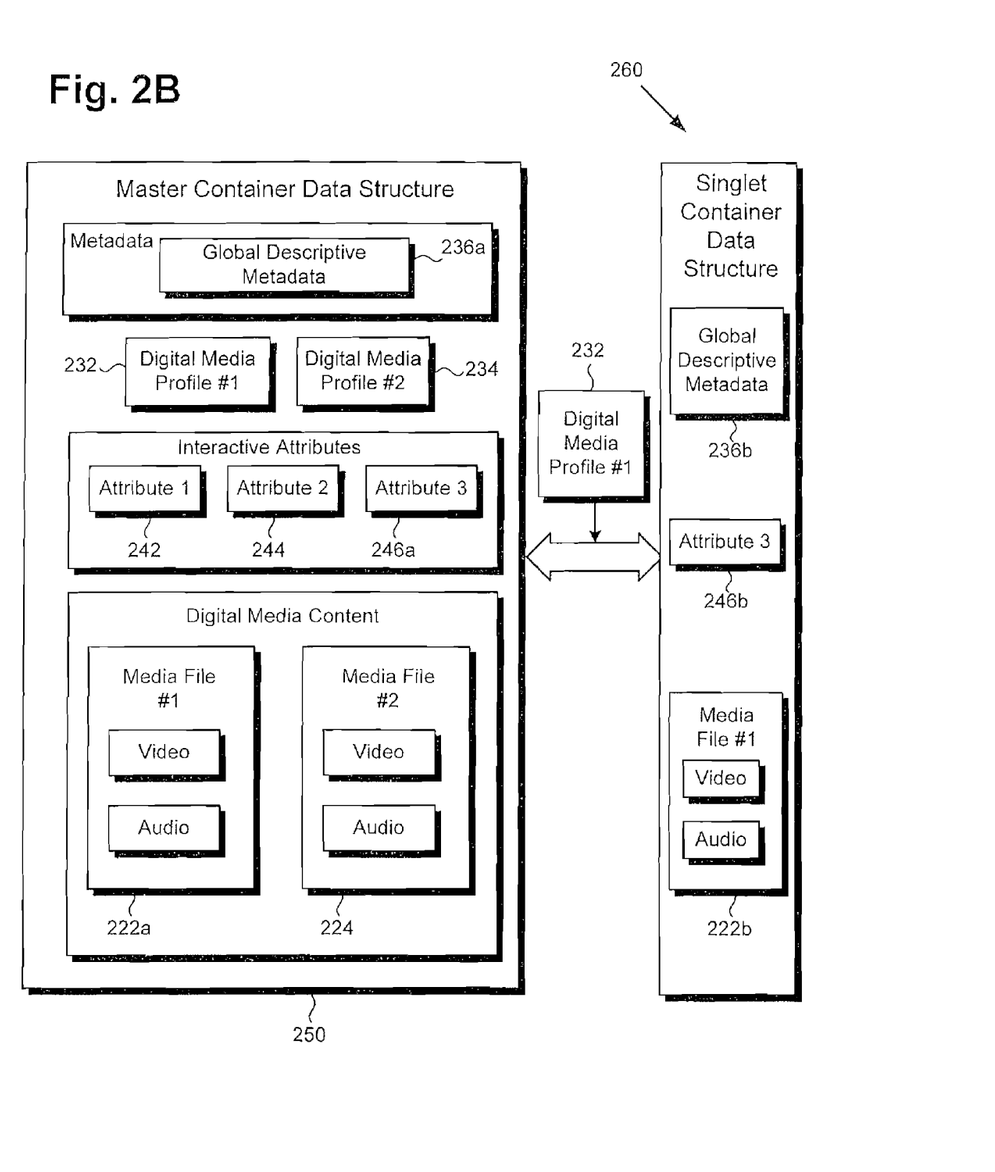
FIG. 2B shows a block diagram of a singlet container data structure assembled from the contents of the master container data structure of FIG. 2B, according to one embodiment of the present invention.

The operation of system 100, in FIG. 1, will now be further described by reference to FIGS. 2A and 2B. FIG. 2A shows a block diagram of master container data structure 250 for use in a system for managing digital media content, according to one embodiment of the present invention. FIG. 2B shows a block diagram of singlet container data structure 260 assembled from the contents of master container data structure 250 according to one embodiment of the present invention.

Referring first to FIG. 2A, FIG. 2A shows master container data structure 250, comprising digital media content corresponding to media files 222a and 224, and associated data including global descriptive metadata 236a, digital media profiles 232 and 234, and interactive attributes 242, 244, and 246a. Master container data structure 250 corresponds to master container data structure 150, in FIG. 1. Moreover, media files 222a and 224, in FIG. 2, correspond respectively to media files 122a and 124, in FIG. 1. Global descriptive metadata 236a, digital media profiles 232 and 234, and interactive attributes 242, 244, and 246a were previously discussed in conjunction with system 100, but not explicitly shown in FIG. 1. It is noted that although in the present embodiment, master container data structure 250 is shown to hold two media files, i.e., media files 222a and 224, in other embodiments, master container data structure 250 can be implemented to store one or more additional versions of the digital media content corresponding to media files 222a and 224. Consequently, master container data structure 250 is configured to store at least two media files such as media files 222a and 224.

Media files 222a and 224, which may themselves comprise media container file structures such as MP3, MP4, or ASF, for example, can include audio and video elements, as shown in FIG. 2A. In one embodiment, for example, media files 222a and 224 may comprise audio-visual files containing digital media content including film content, or television program content, or games. In some embodiments, media files 222a and 224 may be streamable media files suitable for playback by a consumer utilizing a remote client system, such as client system 104, in FIG. 1, accessing media server 110 over network 102, for example. As previously discussed, media files 222a and 224 may comprise distinct instantiations of the digital media content having that digital media content in different encoding formats. For example, media file 222a can comprise digital media content encoded as SD content, while media file 224 may comprise the digital media content encoded as HD content, or in a reduced resolution for distribution to a portable communication device, such as a mobile telephone, digital media player, PDA, portable computer, or wireless gaming console, for example. Alternatively or in addition, media files may differ at a content level such that a first media file represents a "G" rated version of content and another media file represents a "PG-13" version of the content, or one file may represent a complete version of the content while another media file represents a synopsis or "webisode" version of the content. It is contemplated that so long as the content is thematically related such as versions of a song, television show, film or the like. Although the container file format could support thematically diverse content such as all songs on an album, or all episodes of an episodic video production, it is contemplated that practical implementations will be limited to versions of a single song or versions of a single episode.

In addition to media files 222a and 224, master container data structure 250 also comprises metadata including global descriptive metadata 236a, and digital media profiles 232 and 234. Global descriptive metadata 236a may include metadata relevant to all media files stored in master container data structure 250, which in the present instance includes media files 222a and 224. For example, where media files 222a and 224 are different versions of the same movie content having different encoding formats, global metadata 236a may comprise the movie title, which is equally relevant to the differently encoded version of the movie represented by media files 222a and 224.

Digital media profiles 232 and 234 may each comprise metadata corresponding to one of media files 222a and 224. In the embodiment of FIG. 2A, for example, digital media profile 232 may corresponds to media file 222a, and digital media profile 234 may correspond to media file 224. Where, for example, the different versions of the digital media content represented by media files 222a and 224 are targeted to distinct distribution channels or specific types of playback devices, digital media profile 232 and 234 may comprise metadata attributes unique to those distinct channels and devices. Information such as encoding format, aspect ratio, or video frame rate is typically specific to the distribution channel or playback device facilitating consumption of the core digital media content, and thus might constitute metadata included in digital media profiles 232 and 234. Other information possibly carried by digital media profiles 232 and 234 would a complete set or a subset of the descriptive metadata associated with media 222a and 224.

As shown in FIG. 2A, in some embodiments, master container data structure 250 may further comprise interactive attributes 242, 244, and 246a, each of which may be associated with one or both of media files 222a and 224. As previously discussed, interactive attributes 242, 244, and 246a may comprise menuing content, movie or television trailers associated with the digital media content represented by media files 222a and 224, games associated with that digital media content, and advertising content, for example.

In some embodiments, it may be deemed desirable to reduce and standardize the number of encoding formats for the digital media content represented by media files 222a and 224 down to a relatively few number of well defined standardized profiles. In the embodiment of FIG. 2A, for example, each of media files 222a and 224 may correspond to digital media content encoded according to a particular one of the standardized profiles. The profiles, which would be preferably limited in number, allow for HD to low resolution media encodes that are compatible with playback devices ranging from HD Blu-ray players, to mobile communication devices, to portable players such as the iPod and other digital media players.

Referring now to FIG. 2B, FIG. 2B shows a block diagram of singlet container data structure 260 assembled from the contents of master container data structure 250, according to one embodiment of the present invention. FIG. 2B includes master container data structure 250 and all of its contents, as described in relation to FIG. 2A. FIG. 2B also shows singlet container data structure 260 including global descriptive metadata 236b, interactive attribute 246b, and media file 222b. Singlet container data structure 260 containing media file 222b corresponds to singlet container data structure 160 containing media file 122b, in FIG. 1. As shown in FIG. 2B digital media profile 232 specifies the media elements to be assembled into singlet container data structure 260. Thus, in the embodiment of FIG. 2B, singlet container data structure 260 is produced from the contents of master container data structure 250, according to digital media profile 232.

Singlet container data structure 260 may be produced by server processor 112, in FIG. 1. Server processor 112 may utilize data provided by digital media profile 232 to assemble singlet container data structure 260 from the contents of master container data structure 250. Thus, as shown in FIG. 2B, singlet container data structure 260 is assembled to include media file 222b, interactive attribute 246b, and global descriptive metadata 226b, corresponding respectively to the contents: media file 222a, interactive attribute 246a, and global descriptive metadata 236a of master container data structure 250.

As a specific example of the foregoing, where media file 222a comprises media content encoded as HD content, digital media profile 232 may simply specify selection of media elements tagged as desirable for presentation with HD content. Such media elements, e.g., interactive attribute 246a, could then be selected for inclusion in singlet container data structure 260, while others not tagged for use with HD content, e.g., interactive attributes 242 and 244, are omitted from singlet container data structure 260. Analogously, where media file 222a comprises media content encoded for distribution to a portable device, digital media profile 232 could specify selection of media elements from master container data structure 250 by virtue of their being tagged as suitable for presentation on a portable device.

It is noted that although in the embodiment of FIG. 2B, all of the media elements selected for inclusion in singlet container 260 are extracted from master container data structure 250, more generally, that need not be the case. For example, one or more of interactive attributes 242, 244, and 246a, as well as the digital media profiles 232 and 234, may be retrieved from other sources. Sources from which the various media elements may be retrieved include other data structures on media server 110, and/or alternative media sources accessible over network 102, for example. In one embodiment, for example, digital media profiles 232 and 234 may include data providing an external location of interactive attributes 242, 244, and 246, and/or other media elements, such as by providing a Uniform Resource Identifier (URI) for dynamic linking to external media elements.

To summarize the system described by the present discussion, and referring to FIGS. 1, 2A, and 2B to do so, system 100 for managing digital media content comprises media server 110 accessible over communications network 102. Server processor 112 of media server 110 is configured to identify a first container data structure, e.g., master container data structure 250, including the digital media content encoded in a first encoding format, e.g., media file 222a. Server processor 112 is also configured to read a digital media profile, e.g., digital media profile 232. Server processor 112 is further configured to extract media file 222a from master container data structure 250, and assemble media file 222b in a second container data structure, e.g., singlet container data structure 260.

In some embodiments, master container data structure 250 includes interactive attributes, such as interactive attributes 242, 244, and/or 246a that are associated with one or more of media files 222a and 224. In one embodiment, for example, server processor 112 may interpret digital media profile 232, and select one or more of interactive attributes 242, 244, and 246a for inclusion in singlet container data structure 260 according to digital media profile 232. Furthermore, in some embodiments, media server 110 is furthered configured to provide the second container data structure, e.g., singlet container data structure 160, over network 102.

Moreover, in one embodiment, server processor 112 may be configured to utilize application interface 126 of master container data structure 150 to produce singlet container data structure 160 from contents of master container data structure 150. As shown in FIG. 2B, singlet container data structure 260 may include media file 222b, global descriptive metadata 236b, and in some instances, one or more interactive attributes such as interactive attribute 246b, selected according to digital media profile 232.

Although the present discussion has thus far described master container data structure 150 and singlet container data structure 160 as residing in server memory 114, more generally, master container data structure 150 and singlet container data structure 160 may be stored on any suitable computer-readable medium. For example, media files 222a and/or 224, global descriptive metadata 236a, digital media profiles 232 and/or 234, and in some instances interactive attributes 242, and/or 244, and/or 246a, may be stored on a computer-readable medium, for use by a processor.

The expression "computer-readable medium," as used in the present application, refers to any medium that provides instructions to a processor, such as server processor 112, in FIG. 1. Thus, a computer-readable medium may correspond to various types of media, such as volatile media, non-volatile media, and transmission media, for example. Volatile media may include dynamic memory, such as dynamic random access memory (dynamic RAM), while non-volatile memory may include optical, magnetic, or electrostatic storage devices. Transmission media may include coaxial cable, copper wire, or fiber optics, for example, or may take the form of acoustic or electromagnetic waves, such as those generated through radio frequency (RF) and infrared (IR) communications. Common forms of computer-readable media include, for example, a compact disc read-only memory (CD-ROM), DVD, or other optical disc; a RAM, programmable read-only memory (PROM), erasable PROM (EPROM), FLASH memory, or a transmission carrier wave.

Figure 3:
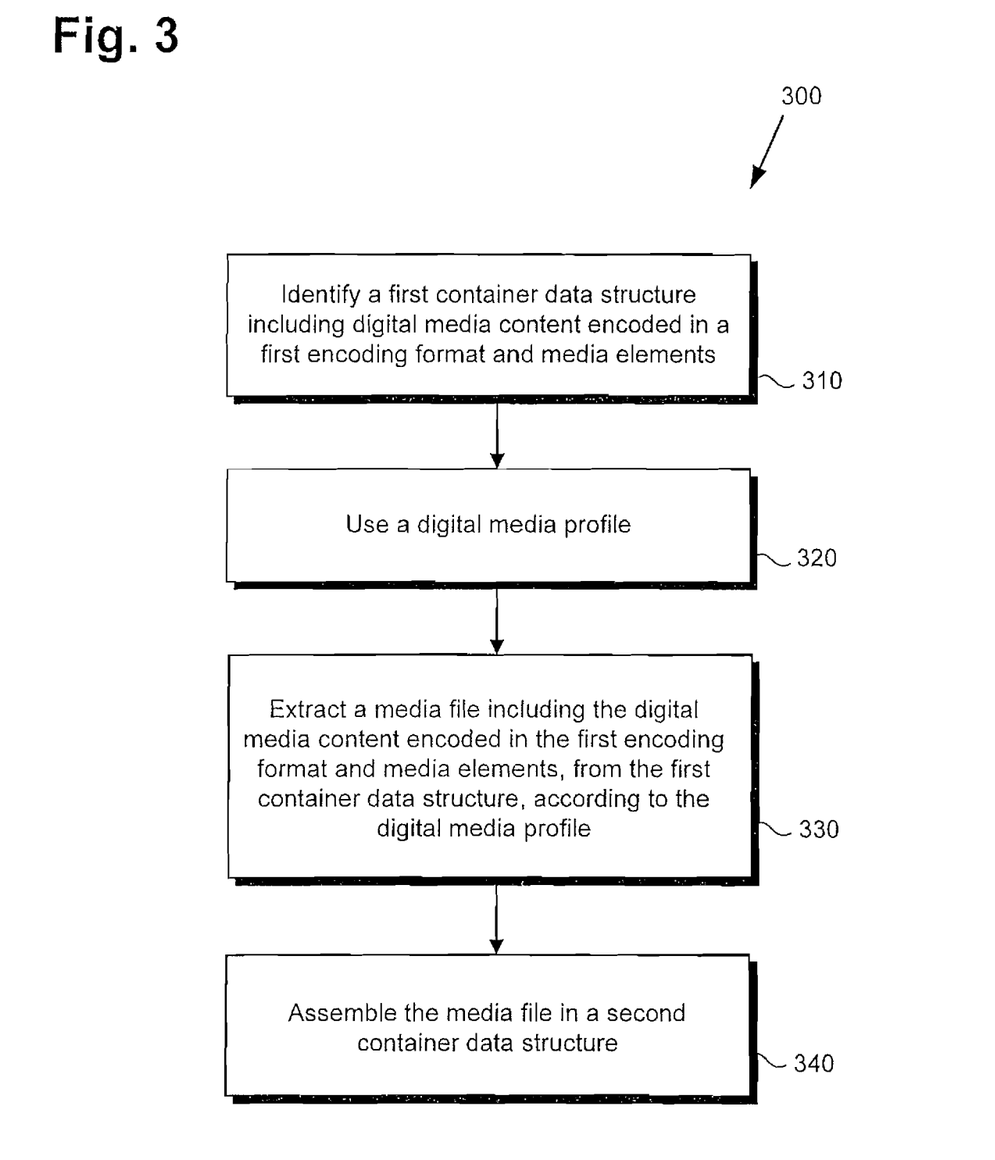
FIG. 3 is a flowchart presenting a method for managing digital media content, according to one embodiment of the present invention.

Turning now to FIG. 3, FIG. 3 shows a flowchart presenting a method for execution by a processor to manage digital media content, according to one embodiment of the present invention. The steps shown in flowchart 300 are merely exemplary, however, so that a step may consist of one or more substeps or may involve specialized equipment or materials, as known in the art. While steps 310 through 340 indicated in flowchart 300 are sufficient to describe one embodiment of the present invention, other embodiments may utilize steps different from those shown in flowchart 300, or may include more, or fewer steps.

Starting with step 310 in FIG. 3 and referring to FIGS. 1 and 2B, step 310 of flowchart 300 comprises identifying a first container data structure, such as master container data structure 150 or 250, including the digital media content encoded in a first encoding format and media elements, as represented by media file 122a or 222a and any of global descriptive metadata 236a and interactive attributes 242, 244, and 246a. Step 310 may be performed by server processor 112, which may be further configured to use a digital media profile, such as digital media profile 232 in step 320. Although in the embodiment of 2B, digital media profiles 232 and 234 are shown to be stored in master container data structure 250, that need not be the case. In some embodiments, for example, step 320 may correspond to using a digital media profile that is an asset external to master container data structure 250.

Continuing with step 330 of flowchart 300, step 330 comprises extracting media file 222a including the digital media content encoded in the first encoding format and media elements, from master container data structure 250, according to digital media profile 232. As was the case for steps 310 and 320, step 330 may be performed by server processor 112. As previously explained, media file 222a may comprise container file structures, and may be audio-visual files and/or streamable media files.

As described, inn the present embodiment, step 330 may comprise selecting one or more interactive attribute for inclusion in the second container data structure, such as interactive attribute 246b, included in singlet container data structure 260. Selection of interactive attributes may be performed according to digital media profile 232, by server processor 112 alone, or in cooperation with an owner of the digital media content of media files 222a, and/or in cooperation with one or more third party contributors authorized by the owner of the digital media content to provide the interactive attributes.

Moving to step 340 of flowchart 300, step 340 comprises assembling media file 222b in a second container data structure, such as singlet container data structure 260. As for the previously described steps, step 340 may be performed by server processor 112. As previously described, media file 222b may comprise a media container file including audio-visual and/or streamable files. Moreover, in some embodiments, media files 222b may comprise the digital media content encoded as HD content, SD content, or encoded for distribution to a portable communication device. As a result, in those embodiments, digital media profile 232 may specify an HD profile, SD profile, or a portable profile. A portable profile may specify the media elements for inclusion in a container data structure for use by a mobile telephone, a digital media player, a PDA, a portable computer, or a wireless gaming console, for example.

In embodiments in which the first container data structure is master container data structure, as shown in FIG. 2B, the present method may result in production of singlet container data structure 260 from contents of master container data structure 250.

Thus, a system and method for managing digital media content has been described. From the above description of the invention it is manifest that various techniques can be used for implementing the concepts of the present invention without departing from its scope. Moreover, while the invention has been described with specific reference to certain embodiments, a person of ordinary skill in the art would recognize that changes can be made in form and detail without departing from the spirit and the scope of the invention. It should also be understood that the invention is not limited to the particular embodiments described herein, but is capable of many rearrangements, modifications, and substitutions without departing from the scope of the invention.

What is claimed is:

1. A system for managing a digital media content, the system comprising:
a media server accessible over a communications network, the media server including a server processor configured to:
identify a first container data structure, the first container data structure including the digital media content encoded in a first encoding format;
extract a media file from the first container data structure according to a digital media profile, the media file including the digital media content encoded in the first encoding format; and
assemble the media file in a second container data structure, wherein the second container data structure further comprises global descriptive metadata and interactive content relevant to the digital media content, the global descriptive metadata and the interactive content selected for inclusion in the second container data structure according to the digital media profile, wherein the digital media profile is a profile of at least one of a distribution channel and a playback device of the media file in the second container data structure.

2. The system of claim 1, wherein the second container data structure is different from the first container data structure, wherein the digital media content in the second container data structure remains encoded in the first encoding format.

3. The system of claim 1, wherein the digital media profile used by the server processor is stored in the first container data structure.

4. The system of claim 1, wherein the digital media profile used by the server processor is an asset external to the first container data structure.

5. The system of claim 1, wherein the digital media profile is provided by an owner of the digital media content.

6. The system of claim 1, wherein the digital media profile is provided by a third party source.

7. The system of claim 1, wherein the media file comprises a media container file.

8. The system of claim 1, wherein the media file comprises an audio-visual file.

9. The system of claim 1, wherein the media file comprises a streamable media file.

10. The system of claim 1, wherein the digital media content comprises one of the digital media content encoded as high-definition (HD) content, the digital media content encoded as standard definition (SD) content, and the digital media content encoded for distribution to a portable communication device.

11. A method for execution by a processor to manage a digital media content, the method comprising:
identifying a first container data structure, the first container data structure including the digital media content encoded in a first encoding format;
extracting a media file from the first container data structure according to a digital media profile, the media file including the digital media content encoded in the first encoding format; and
assembling the media file in a second container data structure, wherein the second container data structure further comprises global descriptive metadata and interactive content relevant to the digital media content, the global descriptive metadata and the interactive content selected for inclusion in the second container data structure according to the digital media profile, wherein the digital media profile is a profile of at least one of a distribution channel and a playback device of the media file in the second container data structure.

12. The method of claim 11, wherein the second container data structure is different from the first container data structure, wherein the digital media content in the second container data structure remains encoded in the first encoding format.

13. The method of claim 11, wherein the digital media profile used by the processor is stored in the first container data structure.

14. The method of claim 11, wherein the digital media profile used by the processor is an asset external to the first container data structure.

15. The method of claim 11, wherein the digital media profile is provided by an owner of the digital media content.

16. The method of claim 11, wherein the digital media profile is provided by a third party source.

17. The method of-claim 11, wherein the media file comprises a media container file.

18. The method of claim 11, wherein the media file comprises an audio-visual file.

19. The method of claim 11, wherein the media file comprises a streamable media file.

20. The method of claim 11, wherein the digital media content comprises one of the digital media content encoded as high-definition (HD) content, the digital media content encoded as standard definition (SD) content, and the digital media content encoded for distribution to a portable communication device.

* * * * *